(12) United States Patent
Guinart et al.

(10) Patent No.: US 11,413,911 B2
(45) Date of Patent: Aug. 16, 2022

(54) METHOD FOR DETERMINING THE POSITION OF A RADIAL ACCELERATION SENSOR OF A WHEEL OF A MOTOR VEHICLE

(71) Applicants: Continental Automotive France, Toulouse (FR); Continental Automotive GmbH, Hannover (DE)

(72) Inventors: Nicolas Guinart, Toulouse (FR); Sébastien Plancke, Toulouse (FR); Jean-Philippe Boisset, Toulouse (FR)

(73) Assignees: CONTINENTAL AUTOMOTIVE FRANCE, Toulouse (DE); CONTINENTAL AUTOMOTIVE GMBH, Hannover (DE)

( * ) Notice: Subject to any disclaimer, the term of this patent is extended or adjusted under 35 U.S.C. 154(b) by 0 days.

(21) Appl. No.: 17/264,112

(22) PCT Filed: Jul. 18, 2019

(86) PCT No.: PCT/EP2019/069387
§ 371 (c)(1),
(2) Date: Jan. 28, 2021

(87) PCT Pub. No.: WO2020/025340
PCT Pub. Date: Feb. 6, 2020

(65) Prior Publication Data
US 2021/0309058 A1    Oct. 7, 2021

(30) Foreign Application Priority Data

Jul. 30, 2018    (FR) ..................... 1857077

(51) Int. Cl.
*G01P 15/09*    (2006.01)
*B60C 23/04*    (2006.01)
*G01P 1/00*    (2006.01)

(52) U.S. Cl.
CPC ...... *B60C 23/0489* (2013.01); *B60C 23/0416* (2013.01); *G01P 1/00* (2013.01); *G01P 15/09* (2013.01)

(58) Field of Classification Search
CPC ... B60C 23/0489; B60C 23/0416; G01P 1/00; G01P 15/09; G01B 7/125; G01B 21/12
See application file for complete search history.

(56) References Cited

U.S. PATENT DOCUMENTS 10,661,616 B2 * 5/2020 Guinart ............... B60C 23/0489
2008/0255795 A1 * 10/2008 Shkolnikov ........... G06F 1/1684
701/532

(Continued)

FOREIGN PATENT DOCUMENTS

| CN | 102347172 A | 2/2012 |
| CN | 102472635 A | 5/2012 |

(Continued)

OTHER PUBLICATIONS

English Translation of Written Opinion for International Application No. PCT/EP2019/069387, dated Oct. 2, 2019, 7 pages.

(Continued)

*Primary Examiner* — Xin Y Zhong
(74) *Attorney, Agent, or Firm* — RatnerPrestia (57) ABSTRACT

A method for determining the position of a radial acceleration sensor of a wheel of a motor vehicle, including: acquiring, by the sensor, signals $S_i$ which are acquired during a predetermined time window $W_i$ when the vehicle is in motion, the windows $W_i$ being different from one another; detecting, for each time window $W_i$, local extrema of the signal $S_i$; determining, for each time window $W_i$, a frequency $F_i$ of the rotation of the wheel of the vehicle as a function of the phase values and of the detection instants for the local extrema detected; filtering of the signals $S_i$, so as to obtain, for each time window $W_i$, a filtered value $Z_i$; and (Continued)

determining the radial distance $R_c$ between the radial acceleration sensor and the axis of rotation of the wheel.

13 Claims, 2 Drawing Sheets

(56) References Cited

U.S. PATENT DOCUMENTS

| | | |
|---|---|---|
| 2011/0130919 A1 | 6/2011 | Neuscheler et al. |
| 2011/0178675 A1 | 7/2011 | Vassilieff et al. |
| 2012/0024680 A1 | 2/2012 | Grünwald |
| 2012/0116607 A1 | 5/2012 | Guinart |
| 2012/0253590 A1 | 10/2012 | Fink |
| 2018/0208003 A1* | 7/2018 | Fink ............... B60C 23/065 |
| 2019/0070910 A1 | 3/2019 | Guinart et al. |

FOREIGN PATENT DOCUMENTS

| | | |
|---|---|---|
| DE | 19702409 A1 | 7/1998 |
| FR | 2935937 A1 | 3/2010 |
| FR | 3042281 A1 | 4/2017 |
| WO | 2007008871 A1 | 1/2007 |
| WO | 2016004194 A1 | 1/2016 |

OTHER PUBLICATIONS

International Search Report and Written Opinion for International Application No. PCT/EP2019/069387, dated Oct. 2, 2019, 10 pages.
International Search Report and Written Opinion for International Application No. PCT/EP2019/069387, dated Oct. 2, 2019, 14 pages (French).
Chinese Office Action for Chinese Application No. 201980050775.0, dated Dec. 14, 2021 with translation, 9 pages.

* cited by examiner

METHOD FOR DETERMINING THE POSITION OF A RADIAL ACCELERATION SENSOR OF A WHEEL OF A MOTOR VEHICLE

CROSS REFERENCE TO RELATED APPLICATIONS

This application is the U.S. National Phase Application of PCT International Application No. PCT/EP2019/069387, filed Jul. 18, 2019, which claims priority to French Patent Application No. 1857077, filed Jul. 30, 2018, the contents of such applications being incorporated by reference herein.

FIELD OF THE INVENTION

The present invention relates to the field of the measurement of physical parameters pertaining to a wheel of a motor vehicle, such as a car for example. It relates more particularly to a method for determining the position of a radial acceleration sensor for a wheel of a motor vehicle, and to a wheel unit configured for implementing such a method.

BACKGROUND OF THE INVENTION

In order to improve driving safety, the current regulations require each newly produced motor vehicle to be equipped with a system for monitoring various physical parameters so as to be able to detect a malfunctioning of one or more elements that make up said motor vehicle. The parameters measured are typically the radial acceleration of at least one wheel of the vehicle, and also the pressure and temperature of the tire with which this wheel is equipped.

Conventionally, such a monitoring system comprises at least one electronic housing, also known as a "wheel unit", mounted on a wheel of the motor vehicle. For example, such a wheel unit collaborates fixedly with a valve of the rim with which the wheel is equipped. As a preference, each wheel of the vehicle is equipped with a wheel unit so as to monitor certain parameters across the entire vehicle.

The wheel unit comprises sensors dedicated respectively to measuring said parameters, such as, for example, a TPMS (Tire Pressure Monitoring System) sensor, dedicated to measuring the pressure in the tire. In addition to these sensors, the wheel unit also comprises a microprocessor, a battery, a memory and a radiofrequency transmitter. To supplement the wheel unit, the monitoring system also comprises a central unit with which the vehicle is equipped and which comprises an electronic computer incorporating a radiofrequency receiver connected to an antenna, this being so as to receive signals transmitted by the wheel unit and, where appropriate, to transmit alerts intended for the driver of the vehicle.

One important criterion regarding correct operation of such a monitoring system lies in the ability of said system to reliably and robustly associate a signal transmitted by a wheel unit with the wheel actually equipped with the transmitting wheel unit. In other words, this is a matter of being capable of locating the origin of the transmitted signals in order, in particular, to avoid transmitting an alert that is in error as to what wheel is affected. For example, in the case of a car, the monitoring system needs to be able to discriminate between the four wheels which are, respectively, the right front, the left front, the right rear and the left rear wheels. It should be noted that compliance with such a criterion needs to be assured throughout the life of the vehicle, particularly even after wheels have been changed or the positions of these wheels have been swapped around.

Various methods have been hitherto used for locating the transmitted signals. First of all, a first solution proposed the use of a plurality of low-frequency antennas in the vicinity of the wheel units, successive excitation of these antennas generating corresponding response signals in the wheel units. The wheels are ultimately located on the basis of these response signals. However, such a solution proves complex and expensive, particularly with regards to the installation of said antennas, and is therefore not considered to be satisfactory.

An alternative solution has also been proposed, which is less expensive and less complex because it does not require the use of low-frequency antennas. This solution seeks to synchronize an angular position of a wheel, for example measured by an ABS sensor (ABS coming from the German "AntiBlockierSystem"), with an instant of transmission of a signal by the wheel unit with which this wheel is equipped, this signal theoretically being transmitted at a fixed position on the wheel. Use of this solution fundamentally relies on knowing the position of a radial acceleration sensor of the wheel unit. The expression "position of a radial acceleration sensor" here refers to the radial distance between the radial acceleration sensor and the axis of rotation of the wheel.

Now, this position of the radial acceleration sensor is, for this alternative solution, an item of data that is programmed or else directly recorded in the memory of the wheel unit by an operator. This then is a fixed data item dependent on the size of the wheel and, more specifically, on the size of the wheel rim. It will therefore be appreciated that, if a wheel is replaced by a new wheel of a different size, this data item needs to be updated. Conversely, if the new wheel is the same size, then it is necessary to check that the data item previously recorded still corresponds. These operations are fiddly and time-consuming and potential sources of error insofar as they require the intervention of the operator.

More recently, it has also been proposed that the position of the radial acceleration sensor be determined dynamically, and while the vehicle is in motion, for example during steps of methods for calibrating the radial acceleration sensor. However, the methods of this type are confined to configurations in which the motor vehicle is moving at a steady speed, that is to say at constant speed, and more specifically at a speed referred to as "high-speed" (typically speeds in excess of 100 km/h). Such an approach is not satisfactory because it involves the use of calculations on the basis of a simplified model of the kinetic equations describing the change in radial acceleration (typically neglecting the sinusoidal components of the acceleration due to gravity and of the longitudinal acceleration respectively). The sensor position thus determined therefore lacks precision which, as a result, greatly limits the precision with which signals transmitted by the wheel unit could be located.

SUMMARY OF THE INVENTION

An aspect of the present invention aims to overcome all or some of the disadvantages of the prior art, particularly those set out hereinabove, by proposing a solution that makes it possible with great precision to determine the position of a radial acceleration sensor of a wheel of a motor vehicle, and to do so from measurements acquired when the vehicle is in motion independently of its speed of travel. An aspect of the invention also seeks to propose a solution that provides a wheel unit comprising a radial acceleration sensor and configured to determine the position of the latter precisely.

To this end, and in a first aspect, the invention relates to a method for determining the position of a radial acceleration sensor of a wheel of a motor vehicle. Furthermore, said method comprises the following steps:

an acquisition step of acquisition, by the radial acceleration sensor, of signals $S_i$, each signal $S_i$ being acquired during a predetermined time window $W_i$ when the vehicle is in motion, the windows $W_i$ being different from one another, a detection step of detecting, for each time window $W_i$, at least three local extrema of the signal $S_i$ which are respectively associated with phase values and with detection instants, a determination step of determining, for each time window $W_i$, a frequency $F_i$ of the rotation of the wheel of the vehicle as a function of the phase values and of the detection instants for the local extrema detected in said time window $W_i$, a filtering step of low-pass filtering of the signals $S_i$, so as to obtain, for each time window $W_i$, a filtered value $Z_i$ associated with the frequency $F_i$, a determination step of determining the radial distance $R_c$ between the radial acceleration sensor and the axis of rotation of the wheel as a function of the filtered values $Z_i$ and of the frequencies $F_i$.

In particular embodiments of the invention, the method for determining the position of the radial acceleration sensor may further comprise one or more of the following features, taken alone or in any technically possible combination.

In one particular embodiment, the step of determining the frequency $F_i$ comprises, for each time window $W_i$ considered, determining a phase time signal $\varphi_i$ by quadratic interpolation of the respective phase values of three local extrema, the frequency $F_i$ being determined by evaluating the derivative of said signal $\varphi_i$ with respect to time at a predetermined instant $t_p$ within said time window $W_i$.

In one particular embodiment, the three local extrema considered within each time window $W_i$ are consecutive.

In one particular embodiment, the cut-off frequency of the low-pass filter applied to the signals $S_i$ is less than or equal to 10 Hz, preferably less than 5 Hz, and more preferably still equal to 1 Hz.

In one particular embodiment, the step of determining the radial distance $R_c$ comprises a linear regression of points $P_i$, each point $P_i$ having $Z_i$ and $F_i^2$ as its ordinate and abscissa values respectively, the radial distance $R_c$ being estimated according to the formula:

$$R_c = C_d/(4 \times \pi^2)$$

where $C_d$ is a quantity representing the gradient of said linear regression.

In one particular embodiment, the quantity $C_d$ is equal to the ratio between the gradient of said linear regression and an error in the gain of the radial acceleration sensor, said gain error $E_i$ being determined, for at least one time window $W_i$, during an estimation step, after the detection step and before the step of determining the radial distance $R_c$, and according to the formula:

$$E_i = V_i/Q_i,$$

where $V_i$ represents an amplitude associated with at least one local extremum of the signal $S_i$ acquired during said at least one time window $W_i$, and $Q_i$ represents an amplitude that is expected on the basis of measurements theoretically supplied by the radial acceleration sensor for said at least one local extremum, the gain error $E_i$ being calculated only if a steady-speed phase is detected for the signal $S_i$.

In one particular embodiment, when a phase time signal $\varphi_i$ is determined in accordance with the invention, the step of estimating a gain error comprises, for each time window $W_i$, making a comparison between the second derivative of the phase time signal $\varphi_i$ and a predetermined value $\varepsilon$, such that if $$|d^2\varphi_i/dt^2| < \varepsilon,$$

a steady-speed phase is detected.

In one particular embodiment, the amplitude $V_i$ corresponds to the amplitude between two consecutive local extrema of the signal $S_i$ in a steady-speed phase, and $Q_i$ satisfies:

$$Q_i = 2 \times g \times G,$$

where g is the acceleration due to gravity, and G represents the gain of a filter applied to the signal $S_i$ during the detection step so as to reduce measurement noise.

According to a second aspect, the present invention relates to a wheel unit comprising a sensor for the radial acceleration of said wheel. Furthermore, said wheel unit comprises means configured to implement the steps of the method according to an aspect of the invention.

According to a third aspect, the present invention relates to a motor vehicle comprising a wheel unit according to an aspect of the invention.

BRIEF DESCRIPTION OF THE DRAWINGS

Aspects of the invention will be better understood upon reading the following description, given by way of entirely non-limiting example and with reference to FIGS. 1 to 4, in which.

In these figures, references that are identical from one figure to the next denote identical or analogous elements. For the sake of clarity, the elements shown are not to scale, unless indicated otherwise.

DETAILED DESCRIPTION OF THE PREFERRED EMBODIMENTS

An aspect of the present invention relates to the field of the measurement of the radial acceleration of a wheel of a motor vehicle, such as a car for example. Conventionally, the units of measurement for radial acceleration are m.s$^{-2}$.

Figure 1:
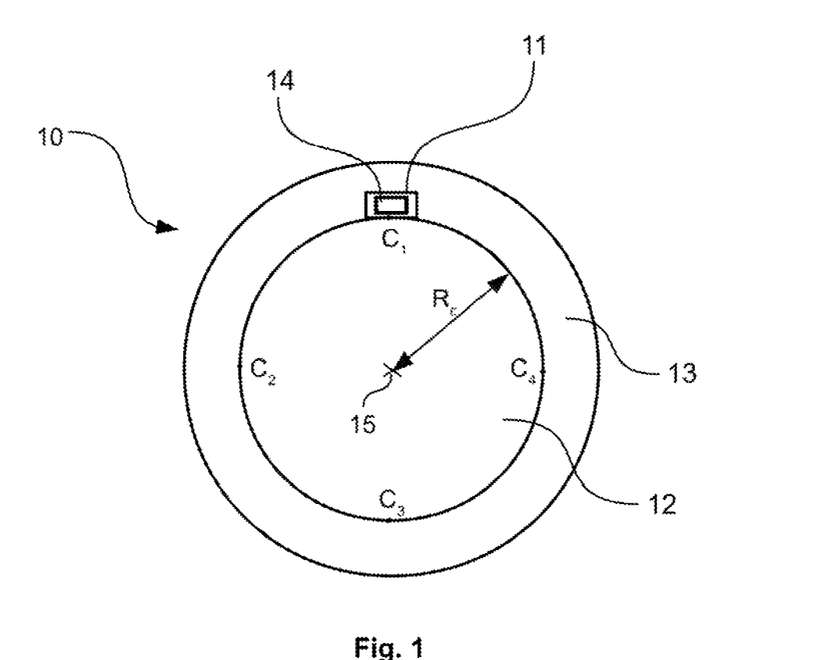
FIG. 1: is a schematic depiction of a wheel of a motor vehicle.

FIG. 1 schematically depicts a wheel 10 of a motor vehicle, said wheel 10 being configured to rotate about an axis of rotation 15.

The motor vehicle (not depicted in the figures) is equipped with a tire pressure monitoring system. Said monitoring system in the conventional way comprises a central electronic unit (not depicted in the figures) arranged inside the vehicle and, on each of the wheels of said vehicle, a wheel unit 11. Without this detracting from the generalized nature of an aspect of the invention, the next part of the description seeks more specifically to detail the operation of a single wheel unit 11, it being appreciated that the explanation given clearly applies, without distinction, to each wheel unit 11 of the vehicle.

The next part of the description considers the configuration in which the wheel unit 11 is attached to the end of the valve of the rim 12 of the wheel 10, for example using a "snap-in" type of connection known to those skilled in the art and so that it is arranged inside the tire 13 with which the wheel 10 is equipped. However, there is nothing to prevent there being a wheel unit 11 attached to the valve of the rim 12 of the wheel 10 in a different way, for example secured by a nut and of "clamp-in" type, or else attached to the rim 12 of the wheel 10 directly, for example using a metal band known per se, by screw-fastening, by bonding, etc.

The wheel unit 11 comprises a radial acceleration sensor 14 configured to take measurements of the radial acceleration of the wheel 10. By way of entirely nonlimiting example, said radial acceleration sensor 14 is of the microelectromechanical system (also known as MEMS) type, for example a piezoelectric accelerometer known per se. However, there is nothing to prevent there being, in other examples not detailed here, a radial acceleration sensor 14 of some other known type.

Figure 2:
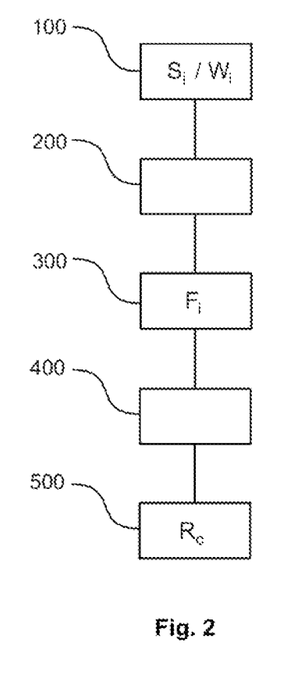
FIG. 2: is a flow diagram of one exemplary embodiment of a method for determining the position of a sensor for the radial acceleration of the wheel of the vehicle.

FIG. 2 is a flow diagram of one exemplary embodiment of a method for determining the position of the sensor 14 for the radial acceleration of the wheel 10 of the vehicle.

The expression "position of the radial acceleration sensor" here refers to the radial distance $R_c$ between the radial acceleration sensor 14 and the axis of rotation 15 of the wheel 10. It should be noted that, in general, the dimensions of the wheel unit 11 are small in comparison with the characteristic dimensions of the wheel 10, notably the length of the radius of the rim 12. As a result, to a first approximation, it is equivalent to consider that said radial distance $R_c$ also corresponds to the radial distance between the wheel unit 11 and the axis of rotation 15 of the wheel 10, also referred to as the "radius of the wheel unit 11". Stated in yet another different way, the respective positions of the radial acceleration sensor 14 and of the wheel unit 11 are considered to be identical, and correspond to the radius of the rim 12.

For the implementation of said method, the wheel unit 11 comprises, for example, a processing circuit (not depicted in the figures) comprising one or more processors and storage means (magnetic hard disk, electronic memory, optical disk, etc.) on which a computer program product is stored, in the form of a set of program code instructions to be executed in order to implement the various steps of the method for determining the position of the radial acceleration sensor 14. Alternatively, or in addition, the processing circuit of the wheel unit 11 comprises one or more programmable logic circuits (FPGA, PLD, etc.), and/or one or more specialized integrated circuits (ASIC), and/or a set of discrete electronic components, etc., suitable for implementing all or some of said steps of the method for determining the position of the radial acceleration sensor 14.

In other words, the processing circuit of the wheel unit 11 comprises a set of means which are configured in the form of software (specific computer program product) and/or hardware (FPGA, PLD, ASIC, discrete electronic components, etc.) to implement the steps of the method for determining the position of the radial acceleration sensor 14.

In one particular embodiment, and entirely nonlimitingly, the wheel unit 11 comprises, in addition to the memory storage means and a radial acceleration sensor 14, also a microprocessor, a battery and a radiofrequency transmitter, as well as temperature and pressure sensors respectively. As for the central unit of the monitoring system, this comprises an electronic computer incorporating a radiofrequency receiver connected to an antenna, this being so as to receive signals transmitted by the wheel unit 11 and, where appropriate, to transmit alerts intended for the driver of the vehicle. Typically, the central unit is configured to transmit alerts when the pressure of a tire 13 drops below a predetermined threshold, thus informing a user of the vehicle of the need to provide additional inflation, or even potentially to replace said tire 13.

The method for determining the position of the radial acceleration sensor 14 comprises several steps. In outline, said method consists first of all in obtaining measurements taken by said sensor 14 during a plurality of time windows. A frequency of rotation of the wheel 10 is determined for each time window as a function of said measurements. Thereafter, the radial distance $R_c$ between the radial acceleration sensor 14 and the axis of rotation 15 of the wheel 10 is determined as a function of the frequency of rotation of the wheel 10 and of filtered values of said radial acceleration measurements. By comparison with the prior art, said method has the objective of allowing a more refined and more precise determination of the position of the radial acceleration sensor 14, the improvement in said determination being conditional here on determining the frequency of rotation of the wheel 10 precisely, whatever the speed of travel of the vehicle.

To this end, the method comprises, first of all, an acquisition step 100 of acquisition, by the radial acceleration sensor 14, of signals $S_i$, each signal $S_i$ being acquired during a predetermined time window $W_i$ when the vehicle is in motion.

In the conventional way, the radial acceleration sensor 14 acquires the signals in analog form. The next part of the description adopts the convention whereby the radial acceleration of the wheel 10 is measured according to a radial axis connecting the sensor 14 to the axis of rotation 15 of the wheel 10 and oriented centripetally. According to such a convention, and after projection onto said radial axis, it is known that a radial acceleration signal is, during the course of a time window, the sum of three components:

- a so-called "mean" component due to the centripetal force exerted on the radial acceleration sensor 14 and equal to:

$R_c \times \omega^2$, where $\omega$ denotes the angular velocity of the wheel 10;
- a so-called "gravitational" component due to the force of gravity exerted on the radial acceleration sensor 14 and equal to:

$g \times \sin(\omega \times (t-t_0) + \varphi(t_0))$, where g represents the acceleration due to gravity, $t_0$ denotes a reference instant in the time window considered, and $\varphi(t_0)$ denotes the initial phase of the signal;
- a so-called "longitudinal" component due to the thrust or braking force experienced by the vehicle as it travels, and equal to:

$y \times \sin(\omega \times (t-t_0) + \varphi(t_0))$, where y denotes the amplitude of the thrust or braking force. Thus, when the vehicle is running at a steady speed, that is to say at constant speed, the longitudinal component is zero.

It should be noted that, as it moves, the wheel 10 of the vehicle may be subjected to vertical movements, that is to say movements oriented in the field of gravity, notably according to the condition of the road (bumps, potholes, etc.). This vertical movement is thus associated with a vertical acceleration component which is not, however, taken into consideration in the breakdown given above for the projection of the radial acceleration signal onto the radial axis. Specifically, because the condition of the road is not known in advance, it is not possible to model the corresponding vertical acceleration in a deterministic manner. Nevertheless, because the vertical movements caused by the condition of the road remain fleeting, they therefore do not affect the validity of the results obtained hereinafter.

As the vehicle moves along, the wheel unit 11, and therefore ultimately the radial acceleration sensor 14, follows the movement of the wheel 10. Specifically, and as illustrated in FIG. 1, the wheel unit 11 will, during the course of a complete revolution of the wheel 10, notably occupy four distinct positions, referred to as extremal positions, and denoted $C_1$, $C_2$, $C_3$ and $C_4$. They respectively correspond to the top, left, bottom and right extreme positions. Thus, when the radial acceleration sensor 14 is in position $C_2$ or $C_4$, the amplitude of the longitudinal component is, in terms of absolute value and when the vehicle is indeed in the process of accelerating, at a maximum, whereas that of the gravitational component is zero. Conversely, when the radial acceleration sensor 14 is in position $C_1$ or $C_3$, the amplitude of the gravitational component is, in terms of absolute value, at a maximum, whereas that of the longitudinal component is zero. It will be appreciated therefore that the values of the radial acceleration fluctuate around the mean component according to the values respectively adopted by the gravitational and longitudinal components.

Figure 3:
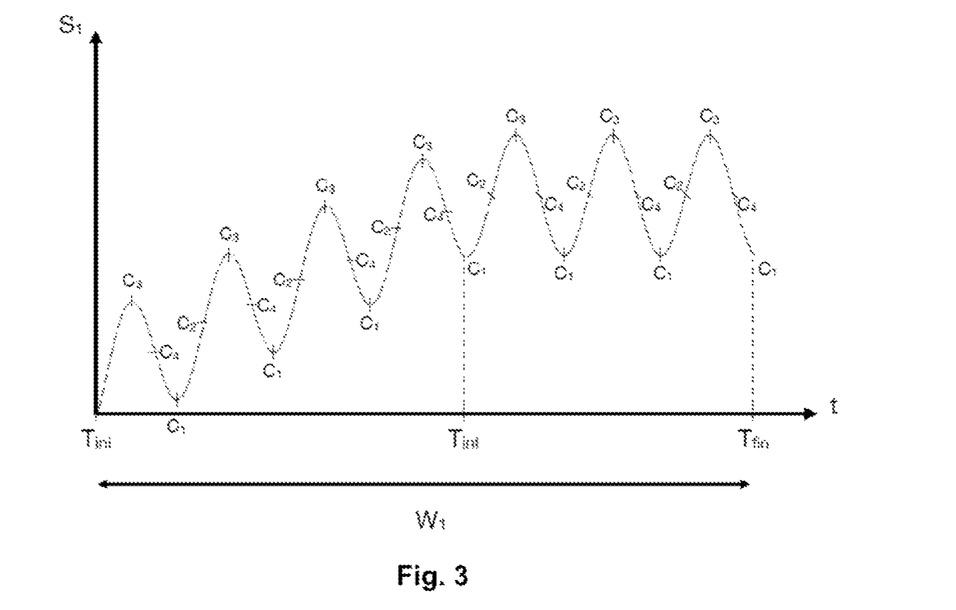
FIG. 3: is a curve representing one example of a signal $S_1$ acquired by the radial acceleration sensor during a time window $W_1$.

FIG. 3 is a curve representing one example of a signal $S_1$ acquired by the radial acceleration sensor 14 during a time window $W_1$. In the example of FIG. 3, the signal $S_1$ is represented in a diagram which, on the abscissa axis, indicates the time measured in seconds and, on the ordinate axis, indicates the value of the radial acceleration, measured in $m.s^{-2}$. Acquisition of the signal $S_1$ begins at an instant $T_{ini}$ considered here, arbitrarily and entirely nonlimitingly, as being the time origin of the diagram. The final acquisition instant is denoted $T_{fin}$, such that the time window $W_1$ corresponds to the interval $[T_{ini}, T_{fin}]$. In this example, the signal $S_1$ comprises first of all a first phase corresponding to a movement of the vehicle at a variable speed, from the initial instant $T_{ini}$ as far as an intermediate instant Tint. During this first phase, the vehicle is running at a speed for which the mean component of the radial acceleration is increasing, which means that its speed is increasing. From Tint onwards, and up to $T_{fin}$, the signal $S_1$ comprises a second phase corresponding to the vehicle moving at a steady speed. During this second phase, the mean component of the radial acceleration and the longitudinal component are respectively constant and zero, such that the vehicle is running at constant speed. Furthermore, the points $C_1$, $C_2$, $C_3$ and $C_4$, which correspond to said extremal positions, are indicated periodically in FIG. 3, according to the revolutions performed by the wheel 10.

It should be noted that the curve $S_1$ illustrated in FIG. 3 is given purely by way of nonlimiting example. Thus, a signal acquired by the radial acceleration sensor 14, although it always exhibits fluctuations about the mean component, may comprise one or more phases of, respectively, steady speed or variable speed (corresponding to an increase or alternatively to a decrease in the speed of the vehicle), and these may occur in any order. Furthermore, it is important to point out that the signals exploited in the later steps of the method, which steps are described hereinafter, are therefore not limited to a steady speed of the vehicle. On the contrary, said method is implemented for radial acceleration signals independently of the speed of travel of the vehicle.

During step 100, at least two signals $S_i$ are acquired during respective time windows $W_i$, said windows $W_i$ being different from one another. The expression "different from one another" refers here to the fact that said windows $W_i$ are not fully superposed. In other words, two time windows are either successive, or partially overlap one another. Such an approach makes it possible to avoid redundancy in the execution of the method.

The next part of the description adopts the convention whereby the vehicle is configured to run at a speed of between 20 km/h and 150 km/h. Such a speed range corresponds to a frequency of rotation of the wheel 10 of between 3 Hz and 25 Hz. As a result, each time window $W_i$ is chosen so as to allow the acquisition of a signal $S_i$ for a duration suitable for detecting local extrema, as described hereinafter. For example, the duration of each time window $W_i$ is between 80 ms and 700 ms. However, there is nothing to prevent the duration of a time window $W_i$, in other examples not detailed here, from being chosen outside of the interval [80 ms, 700 ms], it being within the competence of the person skilled in the art to parameterize such a duration according to the range of speeds of the vehicle.

In one preferred embodiment, the time windows $W_i$ are distinct by pairs. In other words, the time windows $W_i$ are successive and have no instant in common. This approach is advantageous because it allows the acquisition of signals that are sufficiently distinct from one another. The expression "sufficiently distinct from one another" refers here to the fact that the signals $S_i$ cover a broad range of radial accelerations. For example, the signals $S_i$ respectively correspond to radial acceleration values substantially equal to 20 g, 100 g, 200 g, 300 g, etc.

However, there is nothing to prevent the time windows $W_i$ from being configured differently. For example, and by way of alternative, the time windows $W_i$ are consecutive. Since each time window defines a duration between a start instant and an end instant, said time windows are therefore configured in such a way that the end instant of one time window is equal to the start instant of another time window.

Note that the acquisition step 100 is conditional upon said vehicle being in motion. In one exemplary embodiment, the acquisition step 100 is executed just once per driving cycle. The expression "driving cycle" refers here to a cycle beginning, for example, once the vehicle has been driving for at least one minute at a speed greater than 20 km/h and ending, for example, once the vehicle has been stationary for at least 15 minutes. However, there is nothing to prevent a driving cycle being defined, in other examples not detailed here, by other parameters. Alternatively, the step 100 is executed for example periodically after a predetermined number of driving cycles, for example every five driving cycles.

The method then comprises a detection step 200 of detecting, for each time window $W_i$, at least three local extrema of the signal $S_i$.

In one particular embodiment, the detection of the local extrema within each time window $W_i$ involves first of all sampling the signals $S_i$ respectively associated with said windows $W_i$. For example, each signal $S_i$ is sampled at a frequency greater than 500 Hz, for example equal to 2 kHz. However, there is nothing to prevent sampling, in other embodiments not detailed here, at a frequency greater than 2 kHz. To this end, it is within the competence of a person skilled in the art to implement the electronics necessary for sampling at a desired frequency, within the design and cost limitations prescribed by the technical specifications of the manufacture of the wheel unit 11.

Note that the expression "local extremum" refers here to the fact that the criterion of representing a maximum (or else a minimum) that a sample of a signal has to meet in order for this sample to be considered to be an "extremum" is defined in relation to a detection window around said sample.

For example, a detection window for a given sample is defined as being the set encompassing the five samples preceding said given sample, as well as the five samples succeeding said given sample. It is within the competence of a person skilled in the art to choose a suitable size of detection window to be considered, so as to ensure precise detection of the local extrema of a signal.

As a preference, each sampled signal $S_i$ is then filtered in order to remove the measurement aberrations caused, for example, by poor conditions of driving of the vehicle. Filtering the signals $S_i$ in this way makes it possible to avoid detecting local extrema amongst the noise that might be affecting the measurements from the radial acceleration sensor 14. For example, a low-pass filter is applied to the signals $S_i$, the cut-off frequency of said filter preferably being equal to 200 Hz. However, there is nothing to prevent other types of filter with different cut-off frequencies being applied, depending on the information that is to be sought out and isolated in the signals $S_i$.

Once the signals $S_i$ have been sampled, and, where appropriate, filtered, the local extrema are detected in a way known per se, for example using a sliding detection window perusing the time windows $W_i$ associated with said signals $S_i$. In other words, this is a matter of perusing the time series of the samples and of detecting the local extrema therein.

As described above, each signal $S_i$ fluctuates about its mean component. It will be appreciated therefore that the local extrema of a signal $S_i$ correspond to the radial acceleration values acquired at the extremal positions $C_1$ and $C_3$, namely when the gravitational component of the radial acceleration is at a maximum in terms of absolute value. Thus, in the present exemplary embodiment, the local extrema of a signal $S_i$ are respectively associated with detection instants corresponding to the instants at which the radial acceleration sensor 14 occupies either a position $C_1$, or a position $C_3$. These detection instants are also stored in memory by the memory storage means of the wheel unit 11 while waiting to be processed during later steps in the method.

In addition, said local extrema are also respectively associated with phase values corresponding to the values of phases of said positions $C_1$ and $C_3$. In other words, the difference between the respective phases of two consecutive local extrema of a signal $S_i$ is equal to n. More generally, the difference between the respective phases of any two extremal positions $C_1$ and $C_3$ of a signal $S_i$ is a multiple of n.

The next part of the description adopts the convention whereby, for one revolution of a wheel 10, the phase values of the local extrema corresponding to the extremal positions $C_1$, $C_2$, $C_3$ and $C_4$ are respectively equal to 0, n/2, n, 3×n/2. After one revolution of a wheel 10, the phase value for a local extremum corresponding to the position $C_1$ is equal to 2×n (also denoted "2n"), etc.

It is important to note that the act of seeking the local extrema of the signals $S_i$ rather than considering other samples at random is advantageous because it allows them to be characterized reliably via their respective detection instants and phase values. Specifically, the local extrema of a signal $S_i$ correspond to the only samples for which it is possible to attribute a known respective phase value. Away from these local extrema, it is not possible to determine the phase value of a sample.

Thus, at the end of step 200, each local extremum of a signal $S_i$ is associated with a phase value and with an instant of detection within the time window $W_i$.

At the end of said step 200, the method comprises a determination step 300 of determining, for each time window $W_i$, a frequency $F_i$ of the rotation of the wheel 10 of the vehicle as a function of the phase values and of the detection instants for the local extrema detected in said time window $W_i$.

Adopting this approach for determining a frequency $F_i$ is particularly advantageous because it makes it possible to obtain a very precise value which takes account of the dynamics of the wheel 10, and to do so whatever the speed of travel of the vehicle.

In one particular embodiment, for each time window $W_i$ considered, a phase time signal $\varphi_i$ is determined by quadratic interpolation of the respective phase values of three local extrema detected during the preceding step 200. Said time signal $\varphi_i$ therefore corresponds, from a mathematical viewpoint, to a continuous function of which the argument is time.

As an entirely nonlimiting illustration of an example of quadratic interpolation, consider, within a time window $W_i$, three local extrema, respectively associated with the phase values 0, n and 2n. These phase values correspond respectively to the detection instants denoted $t_0$, $t_1$ and $t_2$. The phase signal $\varphi_i$ is sought in the form:

$$\varphi_i(t) = A \times (t-t_0)^2 + B \times (t-t_0),$$

where A and B are constants. The constants A and B are determined in the conventional way by solving a system of two equations with two unknowns. This system can be written:

$$\varphi_i(t_1) = n, \text{ and } \varphi_i(t_2) = 2n,$$

yielding respectively:

$$A = \pi \times \frac{2 - \frac{t_2 - t_0}{t_1 - t_0}}{t_1 \times t_2 \times \left(\frac{t_2 - t_0}{t_1 - t_0} - 1\right)} \text{ and } = \pi \times \frac{(t_2 - t_0)^2 - 2 \times (t_1 - t_0)^2}{t_1 \times t_2 \times (t_2 - t_1)}.$$

Using these calculations, it may be seen that when the duration $t_2-t_0$ is equal to twice the duration $t_1-t_0$, the coefficient A is zero. That corresponds to the situation in which the signal $S_i$, from which the local extrema are extracted, is a sinusoid, namely that the vehicle is traveling at a constant speed and that the phase signal is an affine function of time.

By contrast, when the duration $t_2-t_0$ is not equal to twice the duration $t_1-t_0$, namely when the vehicle is traveling at a variable speed, it will then be appreciated that seeking a quadratic interpolation of the phase advantageously allows a more refined estimate of how the phase signal $\varphi_i$ changes with respect to time. Specifically, in this type of condition, the change in phase signal $\varphi_i$ with respect to time is no longer linear.

As a result, one advantage associated with the fact of performing a quadratic interpolation of the local extrema detected in a time window $W_i$ is that it makes it possible to obtain a phase signal $\varphi_i$ representative of any type of speed of travel of the vehicle, namely both when the speed is steady and when it is variable.

It will also be noted that determining the phase signal $\varphi_i$ according to this embodiment requires very little calculation, and can therefore be executed very quickly. Specifically, said quadratic interpolation is determined by the calculation of said coefficients A and B. Now, these calculations are based solely on algebraic operations using the detection instants, more specifically the durations $t_1-t_0$ and $t_2-t_0$. Therefore, the execution of this type of calculation does not require the wheel unit 11 to have a complex electronic architecture, and this simplifies the design of said unit.

The form in which the phase signal $\varphi_i$ is sought, which is the form indicated hereinabove, corresponds to a configuration in which the phase of the signal $S_i$ acquired in the time window $W_i$ is considered to be zero at the instant $t_0$. This then is a convention adopted in order to simplify the description of an aspect of the present invention. Thus, there is nothing to prevent having, in other embodiments not detailed here, a local extremum associated with a detection instant $t_0$ and for which the value of the phase is a multiple of $\pi$. In that case, it is within the competence of a person skilled in the art to determine the form in which to seek said quadratic interpolation.

It will also be noted that, in order to implement said particular embodiment, the local extrema of the time window considered are consecutive. Adopting that approach advantageously makes it possible to interpolate phase values that are not very widely spaced in time, namely that are obtained from a restricted number of revolutions of the wheel 10, for example typically two revolutions of the wheel 10. In this way, it is possible quickly to obtain a phase signal, without having to wait for numerous revolutions of the wheel 10, this being something that is better suited to determining a frequency representative of a particular speed at which the vehicle is traveling.

However, according to other embodiments, there is nothing to prevent a phase time signal $\varphi_i$ from being determined by quadratic interpolation of non-consecutive local extrema. Insofar as the interpolation sought is a degree two polynomial function, the only condition imposed is that of having three interpolation (and namely therefore three extrema) values available. In general, whatever the local extrema considered, one example of quadratic interpolation is to determine the Lagrange polynomial that passes through these local extrema.

In addition, the inventors have found that seeking the phase signal $\varphi_i$ in the form of a degree two polynomial function made it possible to obtain a good approximation, and therefore sufficient precision for determining a frequency $F_i$ associated with the time window. However, there is nothing to prevent the phase signal $\varphi_i$ from being determined by means of a polynomial regression of degree higher than two, or else again by means of a piecewise polynomial function interpolation, for example using splines.

Once the phase signal $\varphi_i$ has been determined for each time window said frequency $F_i$ is determined in its turn by evaluating the derivative of said signal $\varphi_i$ with respect to time at a predetermined instant $t_p$ within said time window $W_i$.

For example, when the phase signal $\varphi_i$ is determined by quadratic interpolation in the form:

$$\varphi_i(t) = A \times (t-t_0)^2 + B \times (t-t_0),$$

the frequency $F_i$ is given by the formula:

$$F_i = \frac{1}{2\pi} \times \frac{d\varphi_i(t)}{dt}(t_p) = \frac{1}{\pi} \times \left[ A \times (t_p - t_0) + \frac{B}{2} \right].$$

Therefore, the act of determining the phase signal $\varphi_i$ very precisely (by comparison with a simple linear approximation) makes it possible to obtain a very precise value for the frequency of rotation of the wheel 10 at a predetermined instant $t_p$. This frequency is also determined whatever the speed of travel of the vehicle.

In one exemplary embodiment, each time window $W_i$ comprises a start instant and an end instant, the instant $t_p$ being equal to the end instant of the time window $W_i$ concerned. Note that such an instant $t_p$ does not necessarily correspond to an instant of detection of a local extremum in the time window $W_i$. This is why determining the phase signal $\varphi_i$ in the form of a function according to an aspect of the invention allows very precise evaluation of the frequency $F_i$ at this instant $t_p$. However, there is nothing to prevent some other arbitrary instant $t_p$ within a time window $W_i$ being considered in order to evaluate the phase signal $\varphi_i$ and therefore also the frequency $F_i$.

Thus, at the end of step 300, each time window $W_i$ is associated with a frequency $F_i$ of rotation of the wheel 10 of the vehicle. Furthermore, each frequency $F_i$ is associated with a phase value and with a predetermined instant $t_p$ in said time window $W_i$.

The method next comprises a step 400 of low-pass filtering of the signals $S_i$, so as to obtain, for each time window $W_i$, a filtered value $Z_i$ associated with the frequency $F_i$.

The objective of this step is to isolate, first of all, an estimate of the low-frequency value of the radial acceleration, namely therefore an estimate of the mean component of each signal $S_i$. In a way known per se, such a filtering step is performed either in an analog or else in a digital manner.

In one particular embodiment, the cut-off frequency of the low-pass filter applied to the signals $S_i$ is less than or equal to 10 Hz.

As a preference, said cut-off frequency is less than 5 Hz, and more preferably still less than 1 Hz, so as to effectively limit the contributions of the sinusoidal components of each signal $S_i$. However, there is nothing to prevent low-pass filtering, in other embodiments not detailed here, being carried out with a cut-off frequency of a different value. The choice of a particular value for the cut-off frequency conventionally depends on the trade-off between the desired precision and the associated operating cost (this cost being linked in with the complexity of the electronics carried on board the wheel unit 11).

Once a signal $S_i$ has been filtered, and in a second stage, said filtered value $Z_i$ is obtained by considering the value of said filtered signal at the instant $t_p$ at which the frequency $F_i$ was determined during step 300.

In one preferred implementation, the low-pass filtering step 400 is executed in parallel with the step 300 of determining the frequencies $F_i$. For example, when the phase signal $\varphi_i$ is determined in the form of a function as described hereinabove, it will be appreciated that a filtered value $Z_i$ is associated with a frequency $F_i$ because of the fact that this value and this frequency are both obtained while considering the one same instant $t_p$ within the corresponding time window $W_i$. Executing step 400 in parallel with step 300 advantageously allows the method according to an aspect of the invention to be more efficient, notably from the execution time standpoint.

Thus, at the end of the filtering step 400, each frequency $F_i$ in a time window $W_i$ is associated with a filtered value $Z_i$.

The method next comprises a determination step 500 of determining the radial distance $R_c$ between the radial acceleration sensor 14 and the axis of rotation of the wheel 10 as a function of the filtered values and of the frequencies $F_i$.

In order to understand the way in which the values can be linked to the frequencies it should first of all be recalled that the theoretical relationship connecting the mean component of the radial acceleration to the frequency of rotation of the wheel 10 can be obtained by writing the angular velocity ω of the wheel 10 as being equal to the frequency of rotation of the wheel 10 multiplied by 2π. This yields:

$$Z_i = R_c \times 4 \times \pi^2 \times (\omega(t_p))^2 = R_c \times 4 \times \pi^2 \times F_i^2.$$

It is important to note that such a formula corresponds to an ideal configuration in which the radial acceleration sensor 14 takes perfect measurements. Stated differently, in this ideal configuration, the theoretical sensor in particular has no so-called "constant" error $E_c$ (also referred to as measurement error or origin offset error or simply "offset") corresponding to an offset inherent to the technology employed and liable to affect the precision of the measurement. That being the case, in practice, the radial acceleration sensor 14 is unable to take perfect measurements. As a result, a realistic model of the relationship between the mean component of the radial acceleration and the frequency of rotation of the wheel 10, using the values determined during the course of the preceding steps, can be written:

$$Z_i = K \times F_i^2 + E_c,$$

where K is a constant equal to $R_c \times 4 \times \pi^2 \times E_i$, $E_i$ corresponding to an error in the gain of the radial acceleration sensor 14. Because the calculating of the constant error $E_c$ does not form part of the subject matter of an aspect of the present invention, this is not set out in any greater detail hereinafter.

What this means is that the value of the radial distance $R_c$ is fundamentally dependent on the frequencies $F_i$ of rotation of the wheel 10, so that the more precisely the frequencies $F_i$ are determined, the more precise will be the determined radial distance $R_c$ itself. Therefore, the method according to an aspect of the invention makes it possible to obtain a very precise value for the radial distance $R_c$, on the basis of refined estimates of the frequencies and to do so whatever the speed of travel of the vehicle. Furthermore, by obtaining such precision on the distance $R_c$, and therefore in theory on the position of the radial acceleration sensor 14, the wheels of the vehicle can then ultimately be discriminated robustly and reliably when the wheel units with which these wheels are equipped are transmitting signals intended for the central unit.

In one particular embodiment, the determination of the radial distance $R_c$ comprises a linear regression of points $P_i$, each point $P_i$ having $Z_i$ and $F_i^2$ as its ordinate and abscissa values respectively, the radial distance $R_c$ being estimated according to the formula:

$$R_c = C_d / (4 \times \pi^2)$$

where $C_d$ is a quantity representing the gradient of said linear regression. With regard to the above formulae, it is therefore apparent that said quantity $C_d$ is equal to the ratio between the gradient of the linear regression and the error $E_i$ in the gain. Such an embodiment is particularly advantageous because the frequencies $F_i$ have been determined with precision and independently of the speed of travel of the vehicle. A direct result of this is that determining the gradient of the linear regression enjoys the same advantages and that ultimately the same holds true for determining the distance $R_c$.

By way of entirely nonlimiting example, consider two signals $S_1$ and $S_2$ acquired during step 100 and over the course of two time windows $W_1$ and $W_2$ respectively. Said signals $S_1$ and $S_2$ are respectively associated with frequencies $F_1$ and $F_2$, each frequency being calculated at the final instant of the time window concerned. Furthermore, each of the signals $S_1$ and $S_2$ is filtered in order to obtain low-frequency values $Z_1$ and $Z_2$ respectively, likewise at the instants marking the end of the associated time windows. The constant error is then estimated by performing a linear regression of the points $P_1(Z_1, F_1^2)$ and $P_2(Z_2, F_2^2)$. It will be noted that, in this example, this linear regression corresponds in fact to a linear interpolation insofar as there are only two points involved. The radial distance $R_c$ is thus obtained by solving a system of two equations with two unknowns. This system can be written (taking a constant error into consideration even if it has no influence on the rest of the calculations):

$$Z_1 = K \times F_1^2 + E_c, \text{ and } Z_2 = K \times F_2^2 + E_c,$$

yielding:

$$R_c = \frac{1}{4\pi^2} \times \frac{1}{E_i} \times \frac{Z_2 - Z_1}{F_2^2 - F_1^2}.$$

However, there is nothing to prevent the radial distance $R_c$ from being determined using a linear regression involving more than two points $P_i$. Specifically, it will be appreciated that the greater the number of points $P_i$ envisioned, the more precisely this distance can be determined. Nevertheless, the inventors have found that it is already possible to obtain excellent results with just two points $P_i$. Conventionally, the number of points $P_i$ that can be used for performing a linear regression is dependent on the storage capacity of the memory storage means of the wheel unit 11.

It should be noted that the linear regression performed during step 500 is of relevance as soon as at least two signals $S_i$ have been acquired by the radial acceleration sensor 14. For example, the linear regression is performed on the basis of three points $P_i$. These three points $P_i$ may have been freshly acquired, namely have never yet been used for determining a linear regression.

Alternatively, said three points $P_i$ comprise:
  two points that have already been used for determining a previous linear regression and recorded in a memory of the wheel unit 11. Recording a point $P_i$ in a memory of the wheel unit 11 here corresponds to recording characteristic data of said point $P_i$, namely $Z_i$, $F_i$ and the associated detection instant;
  a third point $P_i$ freshly determined during the course of the method according to an aspect of the invention.

In this way, the radial distance $R_c$ is estimated dynamically at any moment while the vehicle is driving, for example after each acquisition of a signal $S_i$ by the radial acceleration sensor 14.

In one particular embodiment, steps 100 to 500 are iterated during a driving cycle. Such an approach allows the determined radial distance $R_c$ to be continually updated, something which is particularly advantageous when the wheel 10 is changed and the information associated with the geometry of said wheel 10 needs to be correlated with the information then recorded, for example by an external operator, in the electronic system of the central unit.

Figure 4:
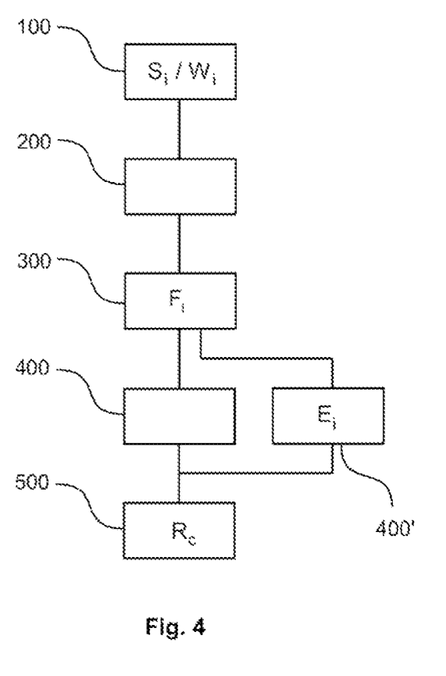
FIG. 4: is a flow diagram of one preferred embodiment of the method of FIG. 2 in which the method comprises a step of estimating an error in the gain of said sensor.

FIG. 4 depicts one preferred embodiment of the method of FIG. 2 in which the method comprises a step 400' of estimating the error $E_i$ in the gain of said sensor 14.

It is known that the gain error (also known as the scaling error) corresponds to the error in the slope of the characteristic curve of the radial acceleration sensor 14. In other words, it is the difference between the signal measured by the radial acceleration sensor 14 and a theoretically expected signal. Also, with a view to improving the precision of the measurements taken by the radial acceleration sensor 14, it is appropriate to be able to estimate said gain error. Specifically, it is found that the current tolerance to design errors of a radial acceleration sensor 14 is becoming increasingly tight, given that measurement precision is becoming increasingly critical for achieving complex functions of the vehicle monitoring system, such as, for example, reliably locating a particular wheel that is experiencing a loss of pressure. Estimating an error in the gain of the radial acceleration sensor 14 therefore makes it possible, in addition to determining the frequency of rotation of the wheel 10, to increase the precision with which the radial distance $R_c$ is determined.

As illustrated in FIG. 4, said step 400' is implemented after the detection step 300, and in parallel with the step 400. For at least one time window $W_i$, an error $E_i$ in the gain of the radial acceleration sensor 14 is estimated using the formula:

$$E_i = V_i / Q_i,$$

where $V_i$ represents an amplitude associated with at least one local extremum of the signal $S_i$ acquired during said at least one time window $W_i$, and $Q_i$ represents an amplitude that is expected on the basis of measurements theoretically supplied by the radial acceleration sensor 14 for said at least one local extremum, the gain error $E_i$ being calculated only if a steady-speed phase is detected for the signal $S_i$.

The condition stipulating that step 400' be executed only if a steady-speed phase is detected in a time window $W_i$ is fundamentally associated with the fact that the profile of a signal $S_i$, in a diagram identical in nature to that of FIG. 3, is sinusoidal during such a steady-speed phase. In other words, the longitudinal component of the radial acceleration is zero.

For example, when a phase time signal $\varphi_i$ is determined as described hereinabove by quadratic interpolation for each time window $W_i$, the step 400' of estimating a gain error, which is then executed after step 300 of determining the frequencies $F_i$ in accordance with FIG. 4, involves making a comparison between the second derivative of said phase time signal $\varphi_i$ and a predetermined value $\varepsilon$, such that if $$|d^2\varphi_i/dt^2| < \varepsilon,$$

a steady-speed phase is detected. It will be appreciated that that amounts to checking whether the derivative of the frequency of rotation of the wheel 10 with respect to time is, in terms of absolute value, less than $\varepsilon/2n$. As an equivalent, this amounts also to checking whether the coefficient A of the degree two monomial of said quadratic interpolation is, in terms of absolute value, less than $\varepsilon/2n$.

As a preference, the predetermined value s is chosen from the interval [0.5, 1], for example equal to 0.6. The lower the chosen value $\varepsilon$, namely the closer it is to zero, the greater the equivalence between the condition to be met in order to detect a steady-speed phase and checking that the profile of a signal $S_i$ is sinusoidal, namely that the frequency of rotation of the wheel 10 is constant. Specifically, with reference for example to the analytical expression for A, it is found that as the value $\varepsilon$ tends toward 0, the condition for detecting a steady-speed phase becomes equivalent to determining whether the duration $t_2-t_1$ is tending toward becoming equal to the duration $t_1-t_0$. However, there is nothing to prevent the value of s being chosen from another interval the upper and lower limits of which are respectively greater than 0.5 and 1. The choice of the limits on said interval is dependent on the limit value for the longitudinal component of the radial acceleration that has been set in order to decide whether the vehicle is in a steady-speed phase.

It will therefore be appreciated that determining the frequencies $F_i$ is not a prerequisite essential to executing the step 400' of estimating the gain error. Thus, in an alternative embodiment (not depicted in the figures), step 400' is executed directly after the detection step 200, in parallel with steps 300 and 400. In such an alternative, the durations separating the instants of detection of the extrema are compared with one another, so that there is no need to determine the frequencies $F_i$ in order to detect a steady-speed phase.

The fact that the gain error $E_i$ associated with a time window $W_i$ is calculated only if a steady-speed phase is detected for the signal $S_i$ advantageously allows a measured amplitude to be compared against a theoretical amplitude for said signal $S_i$.

In one preferred embodiment, the amplitude $V_i$ corresponds to the amplitude between two consecutive local extrema of the signal $S_i$ in a steady-speed phase, and $Q_i$ satisfies:

$$Q_i = 2 \times g \times G,$$

where G represents the gain of a filter applied to the signal $S_i$ during the detection step 200 so as to reduce measurement noise. For example, and as already described hereinabove, when the signals $S_i$ are sampled and then filtered during the detection step 200 in order to remove the measurement aberrations, G is equal to the gain of the filter applied to the signals, which is a known item of data.

In other words, in this example it is a matter of comparing $V_i$, which corresponds to the peak-to-peak amplitude of the signal $S_i$, with the corresponding amplitude theoretically expected on the basis of knowledge of the gain G. It may be noted, with reference to FIG. 3, that said peak-to-peak amplitude corresponds to the amplitude between positions $C_1$ and $C_3$ when the profile of the signal $S_i$ is sinusoidal. The analytical expression for $Q_i$ is justified by the fact that, as explained before, the signal $S_i$ fluctuates about the mean component with an amplitude of between +g and g, and modulated by the gain of the applied filter. The fact that $V_i$ corresponds to a peak-to-peak amplitude is advantageous because $V_i$ is then dependent solely on the gain error.

However, there is nothing to prevent a gain error $E_i$ being calculated with other values of $V_i$ and $Q_i$. For example, according to another exemplary embodiment, $V_i$ represents an amplitude between a local extremum of the signal $S_i$ and the mean component of said signal $S_i$. $Q_i$ then satisfies:

$$Q_i = g \times G.$$

Nevertheless, it should be noted that in this other example, the amplitude $V_i$ is dependent not only on the gain error but also on the way in which the mean component of the signal $S_i$ is determined. For example, if the value of the distance $R_c$ hitherto known (for example the value determined during a previous phase of driving of the vehicle) is marred by an error, the value of $V_i$ relative to the corresponding value of $Q_i$ will also be marred by said error. Such an observation is also true if, for example, the estimate of the speed of rotation of the wheel 10 is erroneous.

Thus, at the end of step 400', each time window $W_i$ (and therefore each signal $S_i$) is associated with a gain error $E_i$. In this way, it is possible to determine whether the gain of the radial acceleration sensor 14 is drifting over the course of time.

The fact that the step 400' is executed after step 200 in parallel with steps 300 and 400, or else after step 300 in parallel with step 400, allows a saving of time in determining the position of the radial acceleration sensor 14.

However, there is nothing to prevent the gain error $E_i$ of the radial acceleration sensor 14 from being considered, in another alternative embodiment, for example when no steady-speed phase is detected, to take the value of unity. In that case, the quantity $C_d$ used in the formula for estimating the radial distance $R_c$ is equal to the gradient of the linear regression of the points $P_i$. Considering a gain error $E_i$ with the value of unity makes it possible to simplify the calculations and therefore lessen the task of the wheel unit 11. Be that as it may, adopting this approach also reduces the precision on determining the radial distance $R_c$ if the actual gain error is different from 1. Nevertheless, even considering a gain error of unity, the precision achieved in determining the radial distance $R_c$ remains highly satisfactory insofar as the frequencies $F_i$ are themselves determined with great precision.

In general, it should be noted that the embodiments considered hereinabove have been described by way of nonlimiting examples, and that other variants are therefore conceivable.

In particular, an aspect of the invention has been described considering the wheel unit 11 to operate advantageously in an autonomous manner, namely without requiring intervention on the part of an external operator, and for this purpose to comprise means suited to implementing each of the steps of the method for determining the position of the radial acceleration sensor 14. However, there is nothing to prevent all or some of said steps, apart from the acquisition step 100, from being performed by the central unit with which the motor vehicle is equipped, or else again for example by computers positioned at a fixed station external to the vehicle, used by one or more operators, and to which data (acquired signals, etc.) would be transmitted in the form of radio electric signals.

The invention claimed is:

1. A method for determining a position of a radial acceleration sensor of a wheel of a motor vehicle, said method comprising:
    an acquisition step of acquisition, by the radial acceleration sensor, of signals $S_i$, each signal $S_i$ being acquired during predetermined time windows $W_i$ when the vehicle is in motion, the windows $W_i$ being different from one another,
    a detection step of detecting, for each time window $W_i$, at least three local extrema of the signal $S_i$ which are respectively associated with phase values and with detection instants,
    a determination step of determining, for each time window $W_i$, a frequency $F_i$ of a rotation of the wheel of the vehicle as a function of the phase values and of the detection instants for the local extrema detected in said time window $W_i$,
    a filtering step of low-pass filtering of the signals $S_i$, so as to obtain, for each time window $W_i$, a filtered value $Z_i$ associated with the frequency $F_i$, and
    a determination step of determining a radial distance $R_c$ between the radial acceleration sensor and an axis of rotation of the wheel as a function of the filtered values $Z_i$ and of the frequencies $F_i$.

2. The method as claimed in claim 1, wherein the step of determining the frequency $F_i$ comprises, for each time window $W_i$ considered, determining a phase time signal $\varphi_i$ by quadratic interpolation of the respective phase values of three local extrema, the frequency $F_i$ being determined by evaluating a derivative of said signal $\varphi_i$ with respect to time at a predetermined instant $t_p$ within said time window $W_i$.

3. The method as claimed in claim 2, wherein the three local extrema considered within each time window $W_i$ are consecutive.

4. The method as claimed in claim 1, wherein the cut-off frequency of the low-pass filter applied to the signals $S_i$ is less than or equal to 10 Hz.

5. The method as claimed in claim 1, wherein the step of determining the radial distance $R_c$ comprises a linear regression of points $P_i$ each point $P_i$ having $Z_i$ and $F_i^2$ as its ordinate and abscissa values respectively, the radial distance $R_c$ being estimated according to the formula:

$$R_c = C_d / (4 \times \pi^2)$$

where $C_d$ is a quantity representing a gradient of said linear regression.

6. The method as claimed in claim 5, wherein the quantity $C_d$ is equal to the ratio between the gradient of said linear regression and an error $E_i$, in the gain of the radial acceleration sensor, said gain error $E_i$, being determined, for at least one time window $W_i$, during an estimation step, after the detection step and before the step of determining the radial distance $R_c$, and according to the formula:

$$E_i = V_i / Q_i,$$

where $V_i$, represents an amplitude associated with at least one local extremum of the signal $S_i$, acquired during said at least one time window $W_i$, and $Q_i$ represents an amplitude that is expected on a basis of measurements theoretically supplied by the radial acceleration sensor for said at least one local extremum, the gain error $E_i$, being calculated only if a steady-speed phase is detected for the signal $S_i$.

7. The method as claimed in claim 6, wherein the step of determining the frequency $F_i$, comprises, for each time window $W_i$ considered, determining a phase time signal $\varphi_i$ by quadratic interpolation of the respective phase values of three local extrema, the frequency $F_i$, being determined by evaluating a derivative of said signal $\varphi_i$ with respect to time at a predetermined instant $t_p$ within said time window $W_i$, and wherein, when a phase time signal $\varphi_i$ is determined, the step of estimating a gain error comprises, for each time window $W_i$, making a comparison between a second derivative of the phase time signal $\varphi_i$ and a predetermined value $\varepsilon$, such that if $|d^2\varphi_i/dt^2| < \varepsilon$, a steady-speed phase is detected.

8. The method as claimed in claim 6, wherein the amplitude $V_i$ corresponds to the amplitude between two consecutive local extrema of the signal $S_i$ in a steady-speed phase, and $Q_i$ satisfies:

$$Q_i = 2 \times g \times G,$$

where g is the acceleration due to gravity, and G represents a gain of a filter applied to the signal $S_i$ during the detection step so as to reduce measurement noise.

9. A wheel unit comprising a radial acceleration sensor, said wheel unit comprising means configured for implementing the method as claimed in claim 1 so as to determine the position of the radial acceleration sensor.

10. A motor vehicle comprising a wheel unit as claimed in claim 9.

11. The method as claimed in claim 7, wherein the amplitude $V_i$ corresponds to the amplitude between two consecutive local extrema of the signal $S_i$ in a steady-speed phase, and $Q_i$ satisfies:

$$Q_i = 2 \times g \times G,$$

where g is the acceleration due to gravity, and G represents a gain of a filter applied to the signal $S_i$ during the detection step so as to reduce measurement noise.

12. The method as claimed in claim 1, wherein the cut-off frequency of the low-pass filter applied to the signals $S_i$ is less than 5 Hz.

13. The method as claimed in claim 1, wherein the cut-off frequency of the low-pass filter applied to the signals $S_i$ is 1 Hz.

* * * * *

UNITED STATES PATENT AND TRADEMARK OFFICE
CERTIFICATE OF CORRECTION

PATENT NO. : 11,413,911 B2
APPLICATION NO. : 17/264112
DATED : August 16, 2022
INVENTOR(S) : Nicolas Guinart et al.

It is certified that error appears in the above-identified patent and that said Letters Patent is hereby corrected as shown below:

In the Claims

Column 18, Claim 5, Line 26, "$P_i$ each" should be -- $P_i$, each --.

Column 18, Claim 6, Line 35, "$E_i$, in" should be -- $E_i$ in --.

Column 18, Claim 6, Line 36, "$E_i$, being" should be -- $E_i$ being --.

Column 18, Claim 6, Line 43, "$V_i$, represents" should be -- $V_i$ represents --.

Column 18, Claim 6, Line 44, "$S_i$, acquired" should be -- $S_i$ acquired --.

Column 18, Claim 6, Line 48, "$E_i$, being" should be -- $E_i$ being --.

Column 18, Claim 7, Line 51, "frequency $F_i$," should be -- frequency $F_i$ --.

Column 18, Claim 7, Line 54, "$F_i$, being" should be -- $F_i$ being --.

Signed and Sealed this
Twenty-fifth Day of October, 2022

Katherine Kelly Vidal
*Director of the United States Patent and Trademark Office*